United States Patent
Mizhen et al.

(10) Patent No.: US 10,185,954 B2
(45) Date of Patent: Jan. 22, 2019

(54) SELECTING A PREFERRED PAYMENT INSTRUMENT BASED ON A MERCHANT CATEGORY

(71) Applicant: GOOGLE INC., Mountain View, CA (US)

(72) Inventors: Boris Mizhen, Brooklyn, NY (US); Kendra Shannon Curtis, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 338 days.

(21) Appl. No.: 15/072,191

(22) Filed: Mar. 16, 2016

(65) Prior Publication Data

US 2016/0196549 A1   Jul. 7, 2016

Related U.S. Application Data

(63) Continuation of application No. 13/542,303, filed on Jul. 5, 2012, now abandoned.

(51) Int. Cl.
*G06Q 30/00* (2012.01)
*G06Q 20/36* (2012.01)
(Continued)

(52) U.S. Cl.
CPC .......... *G06Q 20/36* (2013.01); *G06Q 20/10* (2013.01); *G06Q 20/227* (2013.01);
(Continued)

(58) Field of Classification Search
CPC .............. G06Q 30/0601–30/0643; G06Q 20/08–20/20; G06Q 20/22; G06Q 20/36–20/3678; G06Q 20/387
See application file for complete search history.

(56) References Cited

U.S. PATENT DOCUMENTS

| 5,221,838 A | 6/1993 | Gutman et al. |
| 5,537,476 A | 7/1996 | Coteus et al. |

(Continued)

FOREIGN PATENT DOCUMENTS

| EP | 1 153 375 B1 | 1/2003 |
| SG | 187283 A1 | 1/2013 |

(Continued)

OTHER PUBLICATIONS

U.S. Appl. No. 13/545,702 to Michel Weksler filed Jul. 10, 2012.
(Continued)

*Primary Examiner* — William J Allen
(74) *Attorney, Agent, or Firm* — Johnson, Marouc & Isaacs, LLC

(57) ABSTRACT

The invention provides a computer-implemented method to select a preferred card for a purchase based on a merchant category. In the exemplary method, the computer associates a plurality of financial accounts with an account of a user; associates a merchant category with a financial account associated with the user account; and receives data from a transaction. The computer can maintain a database of merchant categories; determine the category of the merchant based on the data associated with the transaction; and extract data to identify the merchant, such as merchant name, address, or telephone number. The computer can determine the geo-location of the user device and determine the merchant identify from the location. The computer can determine a merchant category of the merchant from the merchant identity; select the financial account associated with the merchant category of the merchant; and communicate the financial account selected to conduct the transaction.

13 Claims, 4 Drawing Sheets

(51) Int. Cl.
*G06Q 30/06* (2012.01)
*G06Q 30/04* (2012.01)
*G06Q 20/22* (2012.01)
*G06Q 20/10* (2012.01)

(52) U.S. Cl.
CPC ........... *G06Q 20/367* (2013.01); *G06Q 30/04* (2013.01); *G06Q 30/06* (2013.01); *G06Q 30/0613* (2013.01); *G06Q 30/0635* (2013.01)

(56) References Cited

U.S. PATENT DOCUMENTS

| | | | |
|---|---|---|---|
| 5,590,038 A | 12/1996 | Pitroda | |
| 5,614,920 A | 3/1997 | Coteus et al. | |
| 5,619,219 A | 4/1997 | Coteus et al. | |
| 5,881,287 A | 3/1999 | Mast | |
| 5,883,810 A | 3/1999 | Franklin et al. | |
| 5,884,271 A | 3/1999 | Pitroda | |
| 6,000,832 A | 12/1999 | Franklin et al. | |
| 6,266,647 B1 | 7/2001 | Fernandez | |
| 6,317,650 B1 | 11/2001 | Powell et al. | |
| 6,450,407 B1 | 9/2002 | Freeman et al. | |
| 6,535,929 B1 | 3/2003 | Provino et al. | |
| 6,601,759 B2 | 8/2003 | Fife et al. | |
| 6,742,704 B2 | 6/2004 | Fitzmaurice et al. | |
| 6,786,400 B1 | 9/2004 | Bucci | |
| 6,879,965 B2 | 4/2005 | Fung et al. | |
| 6,920,611 B1 | 7/2005 | Spaeth et al. | |
| 6,961,941 B1 | 11/2005 | Nelson et al. | |
| 7,065,651 B2 | 6/2006 | Evans | |
| 7,073,070 B2 | 7/2006 | Girard | |
| 7,181,744 B2 | 2/2007 | Shultz et al. | |
| 7,197,648 B2 | 3/2007 | Evans | |
| 7,203,310 B2 | 4/2007 | England et al. | |
| 7,206,940 B2 | 4/2007 | Evans et al. | |
| 7,257,811 B2 | 8/2007 | Hunt et al. | |
| 7,272,726 B2 | 9/2007 | Evans | |
| 7,284,135 B2 | 10/2007 | Evans | |
| 7,293,178 B2 | 11/2007 | Evans et al. | |
| 7,299,365 B2 | 11/2007 | Evans | |
| 7,302,586 B2 | 11/2007 | Evans | |
| 7,337,328 B2 | 2/2008 | Evans | |
| 7,337,329 B2 | 2/2008 | Evans | |
| 7,346,909 B1 | 3/2008 | Eldar et al. | |
| 7,363,265 B2 | 4/2008 | Horgan | |
| 7,380,130 B2 | 5/2008 | England et al. | |
| 7,401,731 B1 | 7/2008 | Pletz et al. | |
| 7,421,533 B2 | 9/2008 | Zimmer et al. | |
| 7,490,324 B2 | 2/2009 | Shultz et al. | |
| 7,600,267 B2 | 10/2009 | Bauchot et al. | |
| 7,619,622 B2 | 11/2009 | de Souza et al. | |
| 7,620,984 B2 | 11/2009 | Kallahalla et al. | |
| 7,631,184 B2 | 12/2009 | Ryan | |
| 7,634,664 B2 | 12/2009 | Ibrahim et al. | |
| 7,657,759 B2 | 2/2010 | Rubin et al. | |
| 7,688,719 B2 | 3/2010 | Rehm | |
| 7,689,926 B2 | 3/2010 | de Souza et al. | |
| 7,702,578 B2 | 4/2010 | Fung et al. | |
| 7,716,377 B2 | 5/2010 | Harris et al. | |
| 7,739,191 B2 | 6/2010 | Sutton et al. | |
| 7,739,417 B2 | 6/2010 | Liu et al. | |
| 7,752,436 B2 | 7/2010 | Grobman et al. | |
| 7,766,244 B1 | 8/2010 | Field et al. | |
| 7,768,522 B2 | 8/2010 | Stauffer et al. | |
| 7,788,713 B2 | 8/2010 | Grobman et al. | |
| 7,797,748 B2 | 9/2010 | Zheng et al. | |
| 7,801,814 B2 | 9/2010 | Cataline et al. | |
| 7,802,000 B1 | 9/2010 | Huang et al. | |
| 7,809,652 B2 | 10/2010 | Dixon et al. | |
| 7,865,414 B2 | 1/2011 | Fung et al. | |
| 7,870,153 B2 | 1/2011 | Croft et al. | |
| 7,890,422 B1 | 2/2011 | Hirka et al. | |
| 7,900,005 B2 | 3/2011 | Kotsovinos et al. | |
| 7,922,083 B2 | 4/2011 | Harrison et al. | |
| 7,941,539 B2 | 5/2011 | Tripathi et al. | |
| 7,949,677 B2 | 5/2011 | Croft et al. | |
| 7,954,150 B2 | 5/2011 | Croft et al. | |
| 7,996,288 B1 | 8/2011 | Stolfo | |
| 8,010,667 B2 | 8/2011 | Zhang et al. | |
| 8,010,679 B2 | 8/2011 | Low et al. | |
| 8,051,180 B2 | 11/2011 | Mazzaferri et al. | |
| 8,060,876 B2 | 11/2011 | Smith et al. | |
| 8,069,121 B2 | 11/2011 | Goodrich et al. | |
| 8,108,641 B2 | 1/2012 | Goss et al. | |
| 8,249,257 B2 | 8/2012 | Brutch et al. | |
| 8,259,948 B2 | 9/2012 | Smith et al. | |
| 8,326,758 B2 | 12/2012 | Bennett | |
| 8,341,732 B2 | 12/2012 | Croft et al. | |
| 8,392,328 B2 | 3/2013 | Shah et al. | |
| 8,401,904 B1 | 3/2013 | Simakov et al. | |
| 8,639,621 B1 | 1/2014 | Ellis et al. | |
| 9,092,767 B1 | 7/2015 | Andrews et al. | |
| 2002/0152156 A1 | 10/2002 | Tyson-Quah | |
| 2003/0061157 A1 | 3/2003 | Hirka et al. | |
| 2003/0126094 A1 | 7/2003 | Fisher et al. | |
| 2003/0140241 A1 | 7/2003 | England et al. | |
| 2003/0200435 A1 | 10/2003 | England et al. | |
| 2004/0024703 A1 | 2/2004 | Roskind | |
| 2004/0049452 A1 | 3/2004 | Blagg | |
| 2004/0148255 A1 | 7/2004 | Beck et al. | |
| 2004/0225509 A1 | 11/2004 | Andre | |
| 2004/0236646 A1 | 11/2004 | Wu et al. | |
| 2005/0039180 A1 | 2/2005 | Fultheim et al. | |
| 2005/0102671 A1 | 5/2005 | Baumberger | |
| 2005/0130680 A1 | 6/2005 | Northcutt | |
| 2005/0160424 A1 | 7/2005 | Broussard et al. | |
| 2005/0198488 A1 | 9/2005 | Sandland et al. | |
| 2005/0199714 A1 | 9/2005 | Brandt et al. | |
| 2005/0210467 A1 | 9/2005 | Zimmer et al. | |
| 2005/0216424 A1 | 9/2005 | Gandre et al. | |
| 2005/0237330 A1 | 10/2005 | Stauffer et al. | |
| 2005/0251446 A1 | 11/2005 | Jiang et al. | |
| 2005/0268298 A1 | 12/2005 | Hunt et al. | |
| 2005/0289540 A1 | 12/2005 | Nguyen et al. | |
| 2005/0289648 A1 | 12/2005 | Grobman et al. | |
| 2006/0050929 A1 | 3/2006 | Rast et al. | |
| 2006/0069828 A1 | 3/2006 | Goldsmith | |
| 2006/0095375 A1 | 5/2006 | Doyle et al. | |
| 2006/0149665 A1 | 7/2006 | Weksler | |
| 2006/0151598 A1 | 7/2006 | Chen et al. | |
| 2006/0155862 A1 | 7/2006 | Kathi et al. | |
| 2006/0178937 A1 | 8/2006 | Rau et al. | |
| 2006/0259390 A1 | 11/2006 | Rosenberger | |
| 2006/0271497 A1 | 11/2006 | Cullen et al. | |
| 2007/0038997 A1 | 2/2007 | Grobman et al. | |
| 2007/0079307 A1 | 4/2007 | Dhawan et al. | |
| 2007/0088762 A1 | 4/2007 | Harris et al. | |
| 2007/0089111 A1 | 4/2007 | Robinson et al. | |
| 2007/0170247 A1 | 7/2007 | Friedman | |
| 2007/0171921 A1 | 7/2007 | Wookey et al. | |
| 2007/0174410 A1 | 7/2007 | Croft et al. | |
| 2007/0174429 A1 | 7/2007 | Mazzaferri et al. | |
| 2007/0179955 A1 | 8/2007 | Croft et al. | |
| 2007/0180447 A1 | 8/2007 | Mazzaferri et al. | |
| 2007/0180448 A1 | 8/2007 | Low et al. | |
| 2007/0180449 A1 | 8/2007 | Croft et al. | |
| 2007/0180450 A1 | 8/2007 | Croft et al. | |
| 2007/0180493 A1 | 8/2007 | Croft et al. | |
| 2007/0186212 A1 | 8/2007 | Mazzaferri et al. | |
| 2007/0192329 A1 | 8/2007 | Croft et al. | |
| 2007/0198656 A1 | 8/2007 | Mazzaferri et al. | |
| 2007/0229505 A1 | 10/2007 | Souza et al. | |
| 2007/0234212 A1 | 10/2007 | de Souza et al. | |
| 2007/0265961 A1 | 11/2007 | Shah et al. | |
| 2008/0015988 A1 | 1/2008 | Brown et al. | |
| 2008/0046349 A1 | 2/2008 | Elberg et al. | |
| 2008/0077917 A1 | 3/2008 | Chen et al. | |
| 2008/0215770 A1 | 9/2008 | Liu et al. | |
| 2008/0222375 A1 | 9/2008 | Kotsovinos et al. | |
| 2008/0227471 A1 | 9/2008 | Dankar et al. | |
| 2008/0244546 A1 | 10/2008 | Schmelter et al. | |
| 2008/0297433 A1 | 12/2008 | Heller et al. | |
| 2009/0037333 A1 | 2/2009 | Flitcroft et al. | |
| 2009/0037672 A1 | 2/2009 | Colbert et al. | |

(56) References Cited

U.S. PATENT DOCUMENTS

| | | |
|---|---|---|
| 2009/0043702 A1 | 2/2009 | Bennett |
| 2009/0070260 A1 | 3/2009 | Flitcroft et al. |
| 2009/0083734 A1 | 3/2009 | Hotra |
| 2009/0083756 A1 | 3/2009 | Kim et al. |
| 2009/0094164 A1 | 4/2009 | Fontaine et al. |
| 2009/0098854 A1 | 4/2009 | Park et al. |
| 2009/0144197 A1 | 6/2009 | Hurry |
| 2009/0164382 A1 | 6/2009 | Sally |
| 2009/0172331 A1 | 7/2009 | Vembu et al. |
| 2009/0192935 A1 | 7/2009 | Griffin et al. |
| 2009/0204964 A1 | 8/2009 | Foley et al. |
| 2009/0240620 A1 | 9/2009 | Kendrick et al. |
| 2009/0313143 A1 | 12/2009 | Darensbourg et al. |
| 2010/0017325 A1 | 1/2010 | Scherpa et al. |
| 2010/0036770 A1 | 2/2010 | Fourez et al. |
| 2010/0058335 A1 | 3/2010 | Weber |
| 2010/0082445 A1 | 4/2010 | Hodge et al. |
| 2010/0082481 A1 | 4/2010 | Lin et al. |
| 2010/0094753 A1 | 4/2010 | Carlson et al. |
| 2010/0114739 A1 | 5/2010 | Johnston |
| 2010/0146074 A1 | 6/2010 | Srinivasan |
| 2010/0211445 A1 | 8/2010 | Bodington |
| 2010/0217916 A1 | 8/2010 | Gao et al. |
| 2010/0256982 A1 | 10/2010 | Bhagchandani et al. |
| 2010/0257040 A1 | 10/2010 | Hunt |
| 2010/0262537 A1 | 10/2010 | Park |
| 2010/0274718 A1 | 10/2010 | Ghosh et al. |
| 2010/0312636 A1 | 12/2010 | Coulter et al. |
| 2011/0006113 A1 | 1/2011 | Uchikura |
| 2011/0055047 A1 | 3/2011 | Fox |
| 2011/0087592 A1 | 4/2011 | van der Veen et al. |
| 2011/0106607 A1 | 5/2011 | Alfonso et al. |
| 2011/0127324 A1 | 6/2011 | Hirka et al. |
| 2011/0131133 A1 | 6/2011 | Hirka et al. |
| 2011/0145152 A1 | 6/2011 | McCown |
| 2011/0153402 A1 | 6/2011 | Craig |
| 2011/0161188 A1 | 6/2011 | Roberts |
| 2011/0179136 A1 | 7/2011 | Twitchell, Jr. |
| 2011/0180598 A1 | 7/2011 | Morgan et al. |
| 2011/0191149 A1 | 8/2011 | Blackhurst et al. |
| 2011/0218849 A1 | 9/2011 | Rutigliano et al. |
| 2011/0238510 A1 | 9/2011 | Rowen et al. |
| 2011/0252095 A1 | 10/2011 | Cypes et al. |
| 2011/0252278 A1 | 10/2011 | Kanno et al. |
| 2011/0282780 A1 | 11/2011 | French et al. |
| 2011/0288919 A1 | 11/2011 | Gross |
| 2011/0289001 A1 | 11/2011 | Bishop et al. |
| 2011/0320345 A1 | 12/2011 | Taveau et al. |
| 2012/0016956 A1 | 1/2012 | Twitchell |
| 2012/0066046 A1 | 3/2012 | Satyavolu et al. |
| 2012/0066681 A1 | 3/2012 | Levy et al. |
| 2012/0078786 A1 | 3/2012 | Anthony et al. |
| 2012/0109681 A1 | 5/2012 | Chapman et al. |
| 2012/0123924 A1 | 5/2012 | Rose et al. |
| 2012/0197773 A1 | 8/2012 | Grigg et al. |
| 2012/0233158 A1 | 9/2012 | Braginsky et al. |
| 2012/0259768 A1 | 10/2012 | Mukherjee |
| 2012/0267432 A1 | 10/2012 | Kuttuva |
| 2013/0024289 A1 | 1/2013 | Cueli et al. |
| 2013/0030934 A1 | 1/2013 | Bakshi et al. |
| 2013/0034221 A1 | 2/2013 | Aaron et al. |
| 2013/0040654 A1 | 2/2013 | Parish |
| 2013/0054458 A1 | 2/2013 | Jandris et al. |
| 2013/0110658 A1 | 5/2013 | Lyman et al. |
| 2013/0275303 A1 | 10/2013 | Fiore et al. |
| 2013/0290181 A1 | 10/2013 | Milner et al. |
| 2013/0311357 A1 | 11/2013 | Kring |
| 2014/0006198 A1 | 1/2014 | Daly et al. |
| 2014/0012704 A1 | 1/2014 | Mizhen et al. |
| 2014/0040125 A1 | 2/2014 | Kunz et al. |
| 2014/0114776 A1 | 4/2014 | Solanki et al. |
| 2014/0129357 A1 | 5/2014 | Goodwin |
| 2016/0148185 A1 | 5/2016 | Andrews et al. |

FOREIGN PATENT DOCUMENTS

| | | |
|---|---|---|
| WO | 2013/015746 A2 | 2/2013 |
| WO | 2014/008471 A1 | 1/2014 |

OTHER PUBLICATIONS

Niquette, "U.S. Office Action issued in copending U.S. Appl. No. 14/743,566, filed Jun. 18, 2015", dated Oct. 21, 2016, 6 pages.

Felten, "U.S. Office Action issued in copending U.S. Appl. No. 13/728,619, filed Dec. 27, 2012", dated Mar. 24, 2017, 13 pages.

Campen, "U.S. Office Action issued in copending U.S. Appl. No. 13/545,702, filed Jul. 10, 2012", dated Nov. 15, 2016, 19 pages.

Campen, "U.S. Office Action issued in copending U.S. Appl. No. 13/545,702, filed Jul. 10, 2012" dated Apr. 27, 2017, 21 pages.

Allen, "U.S. Office Action issued in copending U.S. Appl. No. 13/542,303, filed Jul. 5, 2012", dated Oct. 9, 2014, 16 pages.

Allen, "U.S. Office Action issued in copending U.S. Appl. No. 13/542,303, filed Jul. 5, 2012", dated Jul. 20, 2015, 7 pages.

Allen, "U.S. Office Action issued in copending U.S. Appl. No. 13/542,303, filed Jul. 5, 2012", dated Mar. 2, 2015, 8 pages.

Allen, "U.S. Office Action issued in copending U.S. Appl. No. 13/542,303, filed Jul. 5, 2012", dated Nov. 17, 2015, 9 pages.

Campen, "U.S. Office Action issued in copending U.S. Appl. No. 13/545,702, filed Jul. 10, 2012", dated Nov. 20, 2014, 10 pages.

Campen, "U.S. Office Action issued in copending U.S. Appl. No. 13/545,702, filed Jul. 10, 2012", dated Jun. 11, 2015, 11 pages.

Campen, "U.S. Office Action issued in copending U.S. Appl. No. 13/545,702, filed Jul. 10, 2012", dated Jun. 17, 2013, 14 pages.

Campen, "U.S. Office Action issued in copending U.S. Appl. No. 13/545,702, filed Jul. 10, 2012", dated Feb. 24, 2014, 15 pages.

Campen, "U.S. Office Action issued in copending U.S. Appl. No. 13/545,702, filed Jul. 10, 2012", dated Feb. 17, 2016, 18 pages.

Campen, "U.S. Office Action issued in copending U.S. Appl. No. 13/545,702, filed Jul. 10, 2012", dated Jul. 10, 2014, 9 pages.

Campen, "U.S. Office Action issued in copending U.S. Appl. No. 13/545,702, filed Jul. 10, 2012", dated Mar. 6, 2015, 9 pages.

Campen, "U.S. Office Action issued in copending U.S. Appl. No. 13/545,702, filed Jul. 10, 2012", dated Jul. 7, 2016, 19 pages.

Colbert, "U.S. Office Action issued in copending U.S. Appl. No. 13/759,003, filed Feb. 4, 2013", dated Jun. 6, 2013, 24 pages.

Felten, "U.S. Office Action issued in copending U.S. Appl. No. 13/728,619, filed Dec. 27, 2012", dated Dec. 19, 2014, 11 pages.

Felten, "U.S. Office Action issued in copending U.S. Appl. No. 13/728,619, filed Dec. 27, 2012", dated Jul. 10, 2014, 11 pages.

Felten, "U.S. Office Action issued in copending U.S. Appl. No. 13/728,619, filed Dec. 27, 2012", dated Jul. 9, 2015, 16 pages.

Felten, "U.S. Office Action issued in copending U.S. Appl. No. 13/728,619, filed Dec. 27, 2012", dated Jan. 30, 2014, 8 pages.

Felten, "U.S. Office Action issued in copending U.S. Appl. No. 13/728,619, filed Dec. 27, 2012", dated Aug. 30, 2016, 9 pages.

Hirka, et al., "Multiple Account Advanced Payment Card and Method of Routing Card Transactions", U.S. Appl. No. 11/846,842, filed Aug. 29, 2007, 29 pages.

Johnson, "U.S. Office Action issued in copending U.S. Appl. No. 13/717,295, filed Dec. 17, 2012", dated Feb. 28, 2013, 13 pages.

Lendino, "How to Remotely Disable Your Lost or Stolen Phone", PCMag.co, Apr. 12, 2012, 2 pages.

Nguyen, "U.S. Office Action issued in copending U.S. Appl. No. 13/784,808, filed Mar. 4, 2013", dated Jul. 15, 2013, 20 pages.

Nguyen, "U.S. Office Action issued in copending U.S. Appl. No. 13/784,808, filed Mar. 4, 2013", dated Mar. 4, 2014, 23 pages.

Nguyen, "U.S. Office Action issued in copending U.S. Appl. No. 13/784,808, filed Mar. 4, 2013", dated Nov. 4, 2014, 30 pages.

Nguyen, "U.S. Office Action issued in copending U.S. Appl. No. 13/784,808, filed Mar. 4, 2013", dated Oct. 27, 2015, 6 pages.

Nguyen, "U.S. Office Action issued in copending U.S. Appl. No. 13/784,808, filed Mar. 4, 2013", dated May 29, 2015, 7 pages.

Nguyen, "U.S. Office Action issued in copending U.S. Appl. No. 13/784,808, filed Mar. 4, 2013", dated May 25, 2016, 9 pages.

(56) References Cited

OTHER PUBLICATIONS

Nickitas-Etienne, "International Preliminary Report on Patentability issued in International Application No. PCT/US2013/049446", dated Jan. 15, 2015, 7 pages.
Niquette, "U.S. Office Action issued in copending U.S. Appl. No. 13/784,790, filed Mar. 4, 2013", dated Jun. 13, 2013, 11 pages.
Niquette, "U.S. Office Action issued in copending U.S. Appl. No. 13/784,790, filed Mar. 4, 2013", dated Nov. 5, 2013, 20 pages.
Oh, "International Search Report and Written Opinion issued in International Application No. PCT/US2013/049446", dated Oct. 22, 2013, 10 pages.
Premnath, "Australian Office Action issued in Australian Application No. 2013207643", dated Oct. 14, 2013, 3 pages.
Quittner, "Pay Pal Seeks to Cut Out Card Companies with New Plastic", Oct. 18, 2011, 2 pages.
Shaikh, "U.S. Office Action issued in copending U.S. Appl. No. 13/802,705, filed Mar. 13, 2013", dated Jul. 18, 2013, 11 pages.
Ziegle, "U.S. Office Action issued in copending U.S. Appl. No. 13/658,783, filed Oct. 23, 2012", dated Jan. 20, 2015, 14 pages.
Ziegle, "U.S. Office Action issued in copending U.S. Appl. No. 13/658,783, filed Oct. 23, 2012", dated Mar. 5, 2013, 14 pages.
Ziegle, "U.S. Office Action issued in copending U.S. Appl. No. 13/658,783, filed Oct. 23, 2012", dated May 8, 2015, 14 pages.
Ziegle, "U.S. Office Action issued in copending U.S. Appl. No. 13/658,783, filed Oct. 23, 2012", dated Jul. 11, 2013, 16 pages.
U.S. Appl. No. 13/545,702 to Weksler et al. filed Jul. 10, 2012.
U.S. Appl. No. 13/784,808 to Blandina et al. filed Mar. 4, 2013.

SELECTING A PREFERRED PAYMENT INSTRUMENT BASED ON A MERCHANT CATEGORY

RELATED APPLICATIONS

This patent application is a continuation of and claims priority to U.S. Non-Provisional patent application Ser. No. 13/542,303, filed Jul. 5, 2012, and entitled "Selecting a Preferred Payment Instrument Based on a Merchant Category." The entire disclosure of the above-identified priority application is hereby fully incorporated herein by reference.

TECHNICAL FIELD

The present disclosure relates generally to contactless payment transactions, and more particularly to a method for selecting a preferred payment instrument in a contactless payment transaction based on a category of the merchant.

BACKGROUND

Contactless payments can be transacted by a mobile device of a user with a point of sale terminal of a merchant. The mobile device can communicate with the terminal via near field communication ("NFC"), BLUETOOTH, Wi-Fi, infrared, or any other suitable communication technology. The mobile device can host a payment application, such as a digital wallet, that can complete a transaction with the terminal.

The point of sale terminal can obtain the payment information from the user device and transmit transaction details to the user device. The point of sale terminal can submit the transaction details to the card network to receive payment from the card issuer.

The payment application on a mobile device can support multiple financial accounts and the cards associated with the account. The user can conduct a transaction with different financial instruments, such as credit cards, debit cards, stored value cards, or other payment cards, supported by the application. Currently, the user must select a card at the time of purchase with which to conduct the transaction. That is, at the time of purchase, the user must select a card and apply it to the purchase. Alternatively, the user may assign a card for all transactions until the assignment is changed.

Some cards may be better suited for a particular transaction than other cards. For example, some cards provide better rewards or provide better terms for transactions with certain merchant categories. Remembering which card is the best card for every transaction can create a burden for a user.

A similar process and corresponding deficiencies apply to the use of a payment application for conducting a transaction with an online merchant. The user can attempt a purchase with an online merchant, select a card on the payment application to conduct the transaction, and submit the payment information. The user may have a digital wallet for online purchases that has a card assigned to all purchases.

SUMMARY

The present invention provides a computer-implemented method to select a preferred card for a purchase based on a merchant category. In the exemplary method, the computer associates a plurality of financial accounts with an account of a user, the user account being maintained on the computer; associates a merchant category with a financial account associated with the user account; and receives data from a transaction of the user account with a merchant from a user network device. The computer can maintain a database of merchant categories; determine the category of the merchant based on the data associated with the transaction; and extract data to identify the merchant, such as merchant name, address, or telephone number. The computer can determine the geo-location of the user device and determine the merchant identify from the location. The computer can determine a merchant category of the merchant from the merchant identity; select the financial account associated with the merchant category of the merchant; and communicate the financial account selected to conduct the transaction.

Another aspect of the present invention provides a computer program product that is installed on a server located in a payment system to select a preferred card for a purchase based on a merchant category. The computer program product includes a non-transitory computer-readable storage device having computer-readable program instructions stored therein. The computer-readable program instructions include computer program instructions to associate a plurality of financial accounts with an account of a user, the user account being maintained on the computer; associate a merchant category with a financial account associated with the user account; and receive data from a transaction of the user account with a merchant from a user network device. The instructions can be further configured to maintain a database of merchant categories; determine the category of the merchant based on the data associated with the transaction; and extract data to identify the merchant, such as merchant name, address, or telephone number. The instructions can be further configured to determine the geo-location of the user device and determine the merchant identify from the location. The instructions can be further configured to determine a merchant category of the merchant from the merchant identity; select the financial account associated with the merchant category of the merchant; and communicate the financial account selected to conduct the transaction.

These and other aspects, objects, features and advantages of the exemplary embodiments will become apparent to those having ordinary skill in the art upon consideration of the following detailed description of illustrated exemplary embodiments, which include the best mode of carrying out the invention as presently presented.

DETAILED DESCRIPTION OF THE EXEMPLARY EMBODIMENTS

Overview

Figure 1:
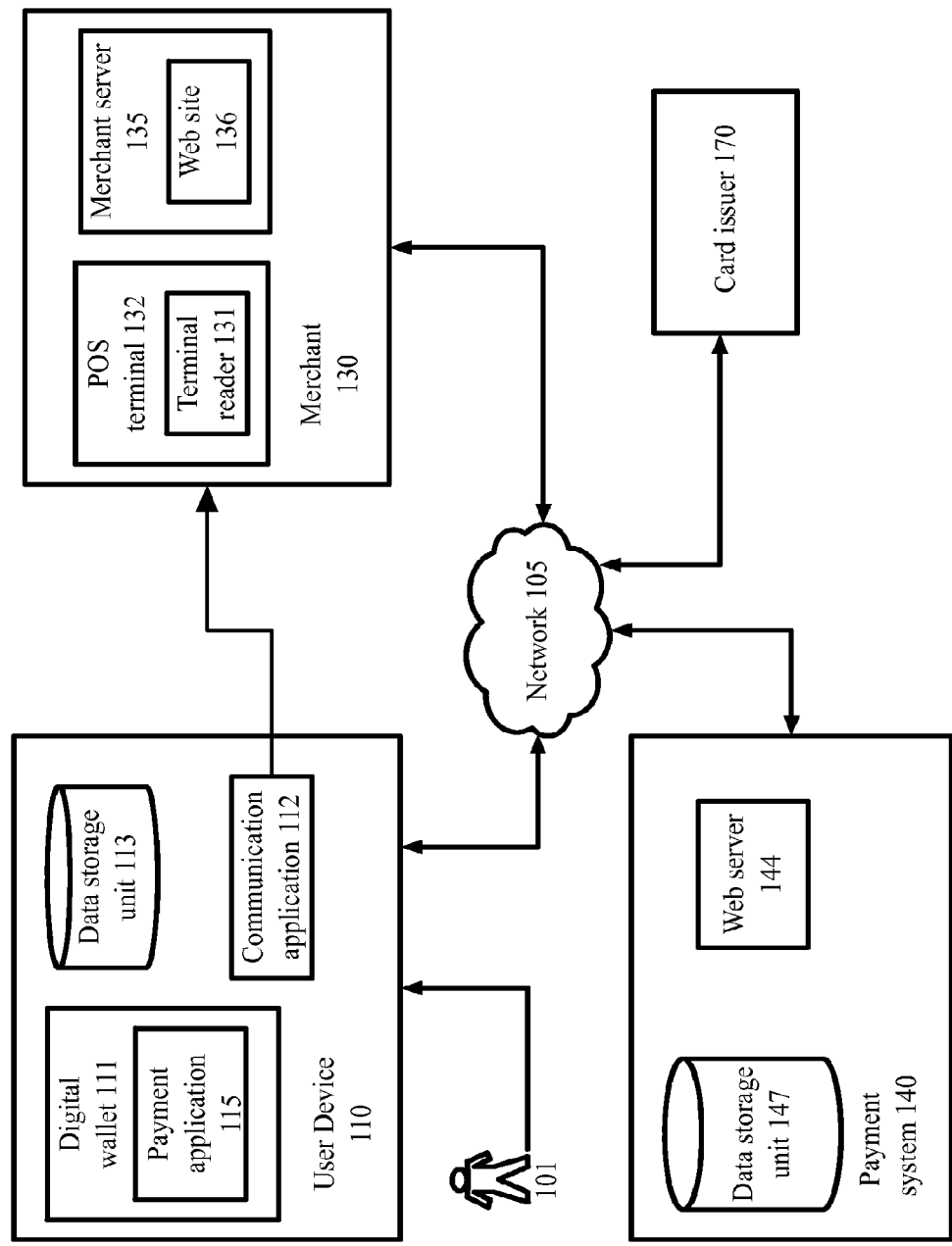
FIG. 1 is a block diagram depicting a system for a payment system to select a preferred card for a contactless payment transaction based on the merchant category, in accordance with certain exemplary embodiments.

A payment system and payment application include specified information for multiple financial accounts, including, but not limited to debit cards, credit cards, stored value cards, loyalty/rewards cards, and coupons (including purchased offers and other offers), each accessible by a digital wallet on a user device. The different financial accounts used for payment transactions will be collectively referred to as "cards". The user sets rules specifying which financial account will be accessed when a contactless transaction is attempted. The user can then add, delete, or change the default payment rules associated with the user. The user can change these default static rules, create new rules, or delete a rule. In an exemplary embodiment, the user can access the payment system account and modify the rules at any time, including a time immediately before a payment transaction is initiated. In an exemplary embodiment, the user can access the payment system account using a mobile device application. The rules can be maintained on the payment application on the user devise or on a server at the payment system.

The user can access a user interface through the user device or on the payment system to establish rules for the preferred card selection. The user can identify a card and associate a merchant category with the card. A transaction at any merchant who is associated with the merchant category will be conducted with the identified card. A user can associate different merchant categories with different cards.

Additionally or alternatively, the user can be presented with a list of merchant categories and associate cards with the categories that the user is likely to encounter.

Merchants can be categorized based on user-configured categories, payment system configured categories, or industry standard categories such as a merchant category code ("MCC"). A database of merchant categories and the assigned merchants can be maintained on the payment system and/or the payment application. The merchants in the database can be identified based on data including products sold, address, name, geo-location, phone number, and any other identifying data.

If a user has not associated a card and a merchant account, the payment system may recommend an association to the user. The payment system can receive the identities of cards associated with merchant categories from other users of the payment system. The payment system can determine which card of the user is the most often selected for a particular merchant category. The payment system can recommend that the user associate the identified card with that particular merchant category. Additionally or alternatively, the payment system can be configured to use the recommended card as a default option should the user not make a selection for a particular category. Additionally or alternatively, the payment system may be configured to use a recommended card in all transactions. That is, the user may not associate any cards with merchant categories and may use a recommended card for all transactions.

At the point of sale device of a merchant a user can tap or swipe a mobile device to initiate a payment transaction. The user may initiate the transaction in any other suitable manner, such as pressing a real or virtual button or speaking a voice command. The user device and the point of sale terminal or other terminal reader device can establish a communication.

The point of sale terminal can transmit details of the merchant and/or the product to be purchased to the user device. The payment application on the user device can receive the details and determine if the merchant is identified in a category. The merchant details can be compared to the details of merchant categories stored in the merchant category database. Merchant details can include any information that may identify the merchant such as address, name, phone number, and any other identifying data.

The user device can additionally or alternatively determine the geo-location of the merchant based on a location application on the device. For example, the user device can use the global positioning system capabilities of the user device or other location determining hardware or software to determine the geo-location of the merchant. The geo-location can be compared to the geo-location of merchants stored in the database to identify a merchant. Alternatively, any other database, registry, or source may be utilized to determine the identity of a merchant based on the geo-location provided.

Alternatively, if the identity of the merchant cannot be determined, the payment system can use the purchased products to identify a merchant category. The purchased products can be compared to the products sold by merchants in the category database. If an unidentified merchant sells similar products to other merchants in a category then the unidentified merchant can be placed into that category.

When the payment system identifies the category of the merchant, the payment system can select the preferred card and transmit the identity of the preferred card to the user device. Additionally or alternatively, the payment system can transmit the category of the merchant to the user device and the payment application can determine the preferred card.

The payment application can display, via a user interface, the identity of the preferred card to the user. The user can accept the card selected and proceed with the transaction or reject the selected card and select an alternative card. Alternatively, the payment application may proceed with the transaction without the approval of the user.

After selecting the preferred card, the payment application can transmit the card information to the point of sale terminal and complete the transaction.

In an alternate embodiment, all of the steps can be performed in an online transaction. The user device may attempt a transaction with an online merchant. The merchant can submit the transaction and the merchant details. The payment system can determine a category of the online merchant. The payment system can select a preferred card for that category and transmit the identification of the preferred card to the merchant to conduct the transaction.

The functionality of the exemplary embodiments will be explained in more detail in the following description, read in conjunction with the figures illustrating the program flow.

System Architecture

Turning now to the drawings, in which like numerals represent like (but not necessarily identical) elements throughout the figures, exemplary embodiments of the present invention are described in detail.

FIG. 1 is a block diagram depicting a system for selecting a preferred card in a contactless payment transaction with a user network device, in accordance with certain exemplary embodiments. As depicted in FIG. 1, the system 100 includes network devices 110, 130, 140, and 170 that are configured to communicate with one another via one or more networks 105.

Each network 105 includes a wired or wireless telecommunication means by which network devices (including devices 110, 130, 140, and 170) can exchange data. For example, each network 105 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 110, 130, 140, and 170 includes a device having a communication module capable of transmitting and receiving data over the network 105. For example, each network device 110, 130, 140, and 170 can include a server, desktop computer, laptop computer, tablet computer, smart phone, handheld computer, personal digital assistant ("PDA"), or any other wired or wireless, processor-driven device. In the exemplary embodiment depicted in FIG. 1, the network devices 110, 130, 140 and 170 are operated by end-users or consumers, merchant operators, payment system operators, and card issuer operators, respectively.

The user 101 can use a communication application 112, such as a web browser application or a stand-alone application, to view, download, upload, or otherwise access documents or web pages via a distributed network 105. The network 105 includes a wired or wireless telecommunication system or device by which network devices (including devices 110, 130, 140, and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The communication application 112 can interact with web servers or other computing devices connected to the network 105, including the point of sale terminal 132 of the merchant 130, the merchant server 135 of the merchant 130, the web server 141 of the payment system 140, and the card issuer 170. The communication application 112 can further communicate with the terminal reader 132 and/or the point of sale terminal 132 of the merchant 130 via any contactless communication technology such as NFC, BLUETOOTH, Wi-Fi, infrared, or other suitable technology.

The user network device 110 may include a digital wallet application 111. The digital wallet 111 may encompass any application, hardware, software, or process the user device 110 may employ to assist the user 101 in completing a purchase. The digital wallet 111 can interact with the communication application 112 or can be embodied as a companion application of the communication application 112. As a companion application, the digital wallet 111 executes within the communication application 112. That is, the digital wallet 111 may be an application program embedded in the communication application 112.

The user device 110 can include a payment application 115. The payment application 115 can interact with the communication application 112 or be embodied as a companion application of the communication application 112 and execute within the communication application 112. The payment application 115 may further be embodied as a companion application of the digital wallet 111 and execute within the digital wallet 111. The payment application 115 may employ a software interface for configuration that may open in the digital wallet application 111 or may open in the web browser application 112. Alternatively, the payment application 115 may be execute on the user device 110 independent of the digital wallet 111 and the communication application 112.

The payment application 115 is operable to allow a user 101 to configure payment accounts on the user device 110 and the payment system 140. The payment application 115 can allow the user 101 to receive transaction details, select preferred cards for a transaction, receive notice of a card selection, provide card information, and provide other suitable services.

The user device 110 also includes a data storage unit 113 accessible by the digital wallet 111, the payment application 115, and the communication application 112. The exemplary data storage unit 113 can include one or more tangible computer-readable storage devices. The data storage unit 113 can be stored on the user device 110 or can be logically coupled to the user device 110. For example, the data storage unit 113 can include on-board flash memory and/or one or more removable memory cards or removable flash memory.

The payment system 140 includes a data storage unit 147 accessible by the web server 144. The exemplary data storage unit 147 can include one or more tangible computer-readable storage devices.

Some or all of the functions of the payment system 140 may be alternatively performed on the payment application 115 of the digital wallet 111. Additionally or alternatively, some or all of the functions of the payment application 115 and the digital wallet 111 may be performed on the payment system 140.

The user 101 can use a web server 144 on the payment system 140 to view, register, download, upload, or otherwise access the payment system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with the user account. The registered financial card accounts may have multiple issuers 170 that maintain each financial account. The payment system 140 also may function as the issuer for the associated financial account. The user's 101 registration information is saved in the payment system's 140 data storage unit 147 and is accessible the by web server 144.

The user 101 also may use the web server 144 to define contactless payment rules and bidding rules. The creation of payment application 115 card selection rules is discussed in more detail hereinafter with reference to the methods described in FIG. 3.

The merchant 130 may use a web server 135 to view, download, upload, create offers, sell products online, or otherwise access the payment system 140 via a website 134 and a communication network 105. The web server 135 may be part of the merchant 130 and located at the merchant 130 location. The web server 135 may alternatively be located at a remote location. The merchant 130 represents an entity that offers products for the user 101 to purchase or use. The merchant 130 includes a point of sale ("POS") terminal 132. The POS terminal 132 may be operated by a salesperson that enters the purchase data into the POS terminal 132 to complete the purchase transaction. The merchant 130 may be embodied as a physical merchant at a physical location or an online merchant. The merchant 130 can employ a terminal reader 131 that can communicate with the user device 110 and receive payment information. The terminal reader 131 may be a function of the POS terminal 132 or may be logically coupled to the POS terminal 132.

The user 101 may request a purchase from the merchant 130. In an exemplary embodiment, the purchase is initiated by a wireless "tap" of the mobile device 110 with the terminal reader 131. In an alternative exemplary embodiment, the purchase is initiated when the user 101 enters an account identification number at the POS terminal 132 or in the mobile device 110. In another alternative exemplary embodiment, the purchase is initiated online with the merchant server 135. The purchase may be initiated via the merchant website 136. In yet another alternative exemplary embodiment, the purchase is initiated by use of a permanent/ temporary virtual/physical token, QR code, bar code, or other suitable machine-readable medium captured by the terminal reader 131. The merchant's POS terminal 132 interacts with an acquirer (for example Chase PaymentTech, or other third party payment processing companies), a card network (for example VISA, MasterCard, American Express, Discover or other card processing networks), the payment system 140, and the issuer 170 (for example Citibank, CapitalOne, Bank of America, and other financial institutions to authorize payment).

System Process

The components of the exemplary operating environment 100 are described hereinafter with reference to the exemplary methods illustrated in FIG. 2.

Figure 2:
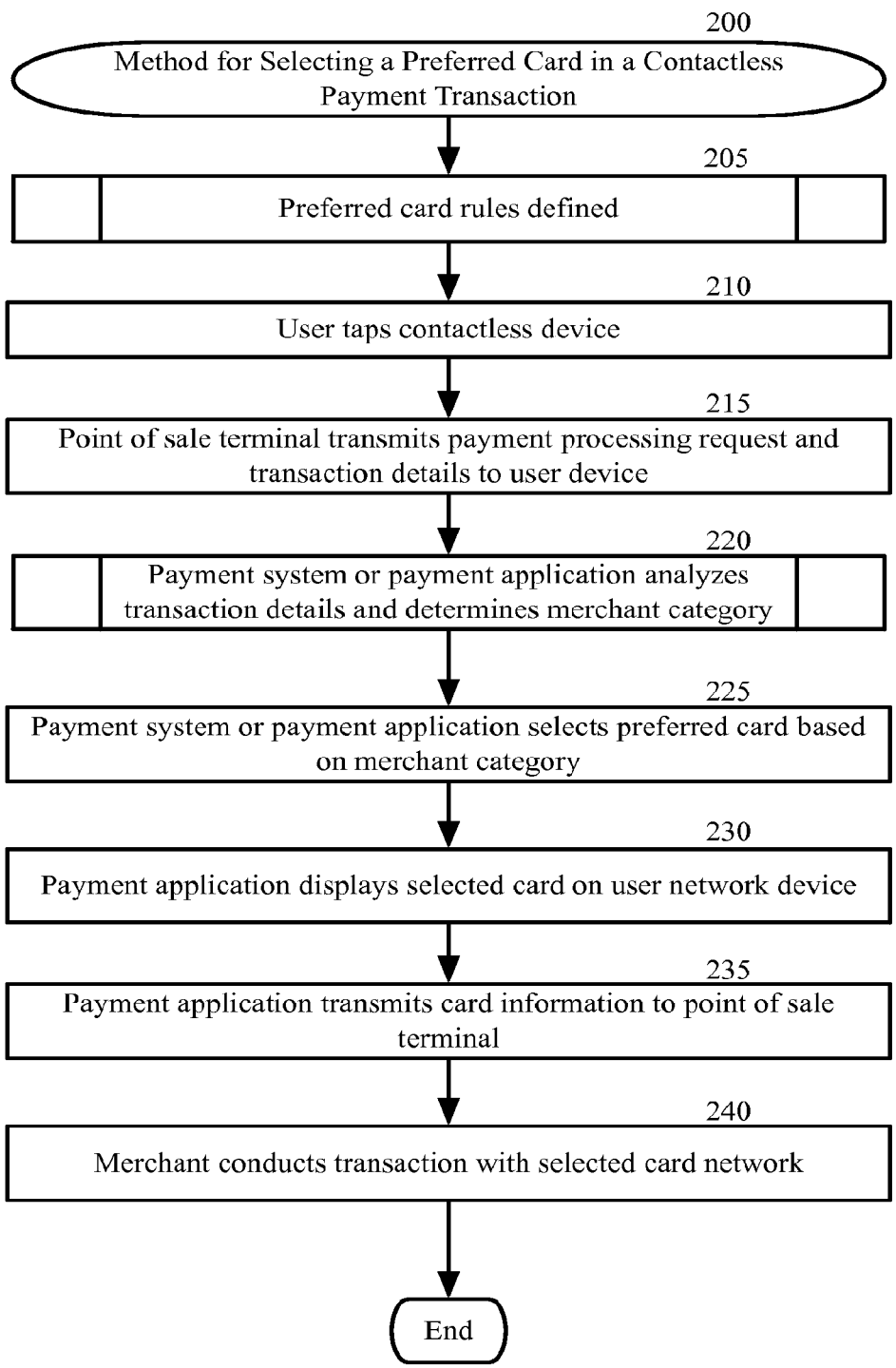
FIG. 2 is a block flow diagram depicting a method to establish a preferred card rule, in accordance with certain exemplary embodiments.

FIG. 2 is a block flow diagram depicting a method 200 to select a preferred card in a contactless payment transaction with a user network device, in accordance with certain exemplary embodiments.

With reference to FIGS. 1 and 2, in block 205, the user 101 configures the rules for the payment application 115. The rules can include instructions for selecting a card to use in a transaction with a merchant 130. The rules include instructions to select a card based on the merchant categories associated with the card. The details of a method to define the preferred card rules are discussed in greater detail in the method 205 with reference to FIG. 3.

Figure 3:
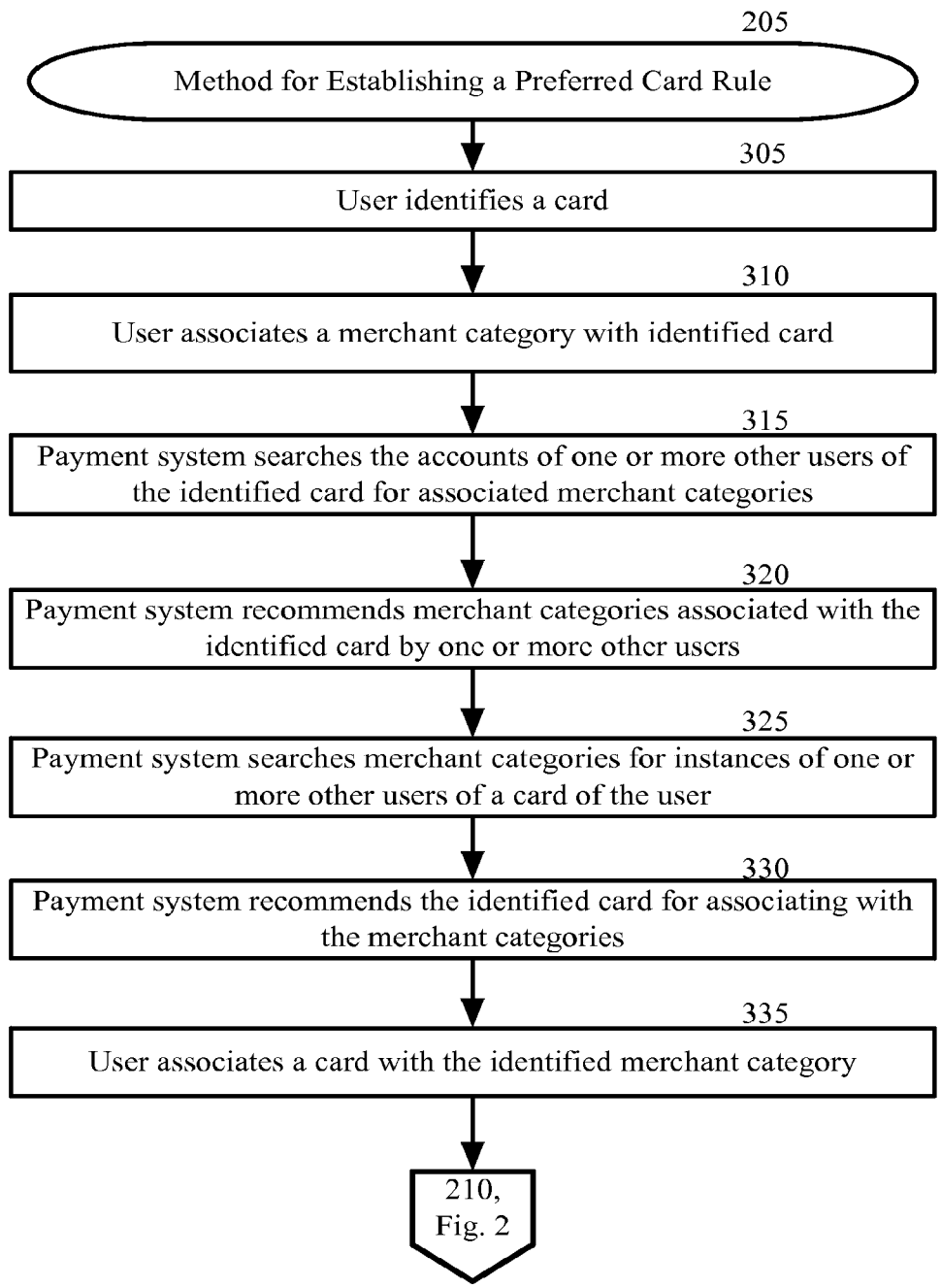
FIG. 3 is a block flow diagram depicting a method for selecting a preferred card in a contactless payment transaction based on the merchant category, in accordance with certain exemplary embodiments.

FIG. 3 is a block flow diagram depicting a method 205 for establishing a preferred card rule in a payment application 115, in accordance with certain exemplary embodiments.

In block 305, a user 101 identifies a card associated with a financial account with a card issuer 170. The payment system 140 and payment application 115 can include specified information for multiple financial accounts, including, but not limited to debit cards, credit cards, stored value cards, loyalty/rewards cards, and coupons (including purchased offers and other offers). The user 101 can set rules specifying which financial account will be accessed when a contactless transaction is attempted. The user 101 can then add, delete, or change the default payment rules associated with the user 101. The user 101 can change these default static rules, create new rules, or delete a rule. In an exemplary embodiment, the user 101 can access the payment system account and modify the rules at any time, including a time immediately before a payment transaction is initiated. In an exemplary embodiment, the user 101 can access the payment system account using a payment application 115 on a user device 110. The rules can be maintained on the payment application 115 on the user devise 110 or on a server 144 at the payment system 140.

In block 310, the user 101 can associate one or more merchant categories with the identified card. For example, the user 101 can configure all transactions with the merchants from a particular category to be conducted with the identified card. Merchants 130 can be categorized based on user 101 configured categories, payment system 140 configured categories, or industry standard categories such as a merchant category code ("MCC"). A database of merchant categories and the assigned merchants can be maintained on the payment system 140 and/or the payment application 115. The user 101 may be presented with a list of merchant categories and offered the opportunity to associate one or more of the categories with the identified card. Alternatively, the user 101 may be presented with the option of entering text descriptions of businesses, names of businesses, or other text input. The payment system 140 may receive the user input and determine the corresponding merchant category from a database of merchant categories.

In block 315, during configuration, if a user 101 has not associated a merchant category with any card of the user 101, the payment system 140 can recommend a card. Alternatively, the payment system 140 can recommend a card at the time of a transaction with a merchant 130 in a category that is not associated with a card.

The payment system 140 can search the accounts of other users of a card issued by a card network 170 associated with the account of the user 101. The payment system 140 can additionally or alternatively focus the search on other users of a card that has the same conditions, terms, rewards, or any other suitable criteria. The payment system 140 can identify frequently associated merchant categories in the accounts of the other users of the card.

In block 320, if a merchant category is associated in the account of a number of users over a defined threshold or a threshold percentage of users, the payment system 140 can recommend the identified merchant category to the user 101. The recommendation can be transmitted to the user 101 via the payment application 115, email, text, or other suitable communication technology.

In block 325, the payment system 140 may alternatively search the merchant categories for a ranking of the most frequent cards with which the merchant categories are associated. The payment system 140 can search the associated cards to determine if the user 101 has any of the highly ranked cards associated with the user account.

In block 330, the payment system 140 can determine which card of the user 101 is the most highly ranked for a particular merchant category. The payment system 140 can recommend the user 101 associate the most highly ranked card and the particular merchant category. The recommendation may be transmitted to the user 101 via the payment application 115, email, text, or other suitable communication technology.

In block 335, the user 101 associates the recommended card with the recommended merchant category. The association may be performed by the user 101 during configuration or at any time after configuration. Additionally or alternatively, the recommendation may be made at the time that a purchase is attempted at a merchant 130 that belongs to a merchant category that has not been associated with a card.

Additionally or alternatively, the user account may be configured to automatically associate a merchant category with a card if the user 101 has not previously performed the association. The automatic association may occur at any time in the process including, but not limited to, the time of sign up, the time of configuration, or when a purchase is attempted.

The user 101 may additionally configure a default card to be used for any transaction with a merchant 130 belonging to a merchant category that has not been associated with a card. The default card may additionally or alternatively, be employed in a transaction where the merchant category cannot be established.

From block 335, the method 205 returns to block 210 in FIG. 2.

Returning now to FIG. 2, in block 210, a user 101 visits a merchant 130 and selects a product for purchase. The term "product(s)" should be interpreted to include tangible and intangible products, as well as services. The user 101 can approach a point of sale ("POS") terminal 132 of a merchant 130. To initiate a payment transaction, the user 101 can "tap" or swipe a user network device 110, such as a near field communication ("NFC") enabled user device 110, to a terminal reader 131 executing on, or logically coupled to, the POS device 132. The user 101 may initiate the transaction in any other suitable manner, such as pressing a real or virtual button or speaking a voice command. The user device 110 and the POS terminal 132 or other terminal reader 131 device can establish a communication. The user device 110 and the POS terminal 132 can communicate via near field communication ("NFC"), BLUETOOTH, Wi-Fi, infrared, or any other suitable communication technology.

In block 215, the POS terminal 132 can transmit a payment processing request to the user device 110. The POS terminal 132 can transmit details of the transaction to the user device 110 and request details of the financial account or card that will conduct the transaction. The POS terminal 132 can transmit details of the merchant 130. The details about the merchant 130 may include, but not be limited to, the merchant category code ("MCC"), the location, the name, the products sold by the merchant 130, and other suitable details that may assist the payment system 140 in determining the merchant category.

The user device 110 can additionally or alternatively determine the geo-location of the merchant 130 based on a location application on the device. For example, the user device 110 can use the global positioning system capabilities of the user device 110 or other location determining application or hardware to determine the geo-location of the merchant 130. The geo-location of the transaction can be compared to the geo-location of merchants stored in a database to identify a merchant 130.

In block 220, the transaction details and the merchant details can be transmitted to the payment system 140 by the payment application 115. The transmission may be conducted via an Internet connection over the network 105, email, text, or any other suitable communication technology. The payment system 140 can compare the details of the merchant 130 to determine the category of the merchant 130.

Figure 4:
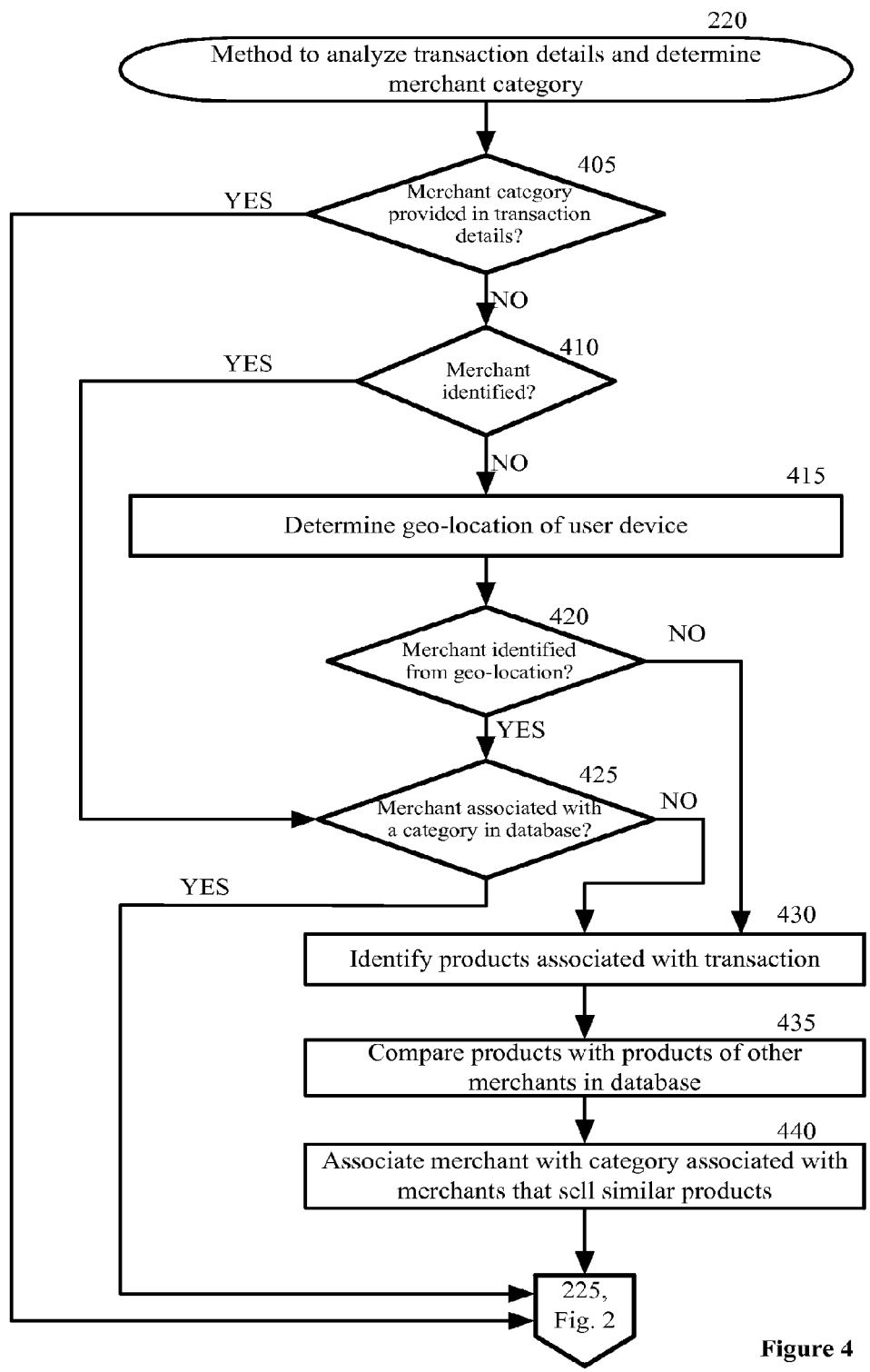
FIG. 4 is a block flow diagram depicting a method to analyze transaction details and determine a merchant category, in accordance with certain exemplary embodiments.

The details of the block 220 to determine the category of the merchant 130 are further described in method 220 in FIG. 4.

In block 405 of FIG. 4, the payment system 140 may utilize the categories as defined by the MCC or the payment system 140 may create and maintain another established category system or develop a new category system. The category system may additionally or alternatively be configured by the user 101 or other operator.

In an alternate exemplary embodiment, the categorizing of the merchant 130 may be executed on the payment application 115.

The category of the merchant 130 can be determined through an analysis of the details provided with the transaction. For example, the details may specify an MCC of the merchant 130. The payment system can use the MCC to directly establish the category of the merchant 130. The details may additionally or alternatively provide a different type of category designation, such as one developed by the payment system 140, the merchant 130, the user 101 or another suitable party. Additionally or alternatively, the details may provide a general description of the category of the merchant. For example, the details may specify that the merchant 130 associated with the transaction is a restaurant, an oil change facility, or a hair salon. The payment system 140 can use the specified merchant type to associate the merchant with a category.

If the MCC or other category designation is provided, then method 220 follows the "YES" branch of block 405 to block 225 with respect to FIG. 2. If the MCC or other category designation is not provided, then method 220 follows the "NO" branch of block 405 to block 410.

Following the "NO" branch of to block 410, if no MCC or other category is provided, the payment system 140 can determine if the merchant 130 name or other identifying detail has previously been recorded in a database. If the merchant 130 has previously conducted a transaction with the payment system 140, the merchant 130 may already be identified by name in a category. If the details provide the name of the merchant 130, the payment system 140 can identify the category to which the merchant 130 belongs by searching the category database and determining the category with which the merchant 130 identity has previously been associated. The payment system 140 can use other identifying information from the details to find the merchant 130 in the database to determine the category of the merchant 130. Other identifiers that may be in a category database for a merchant 130 may include the address, phone number, or other identifying details of a merchant 130.

If the merchant is identified, then method 220 follows the "YES" branch of block 410 to block 425. If the merchant is not identified, then method 220 follows the "NO" branch of block 410 to block 415.

Following the "NO" branch of to block 415, if the identity of the merchant 130 cannot be determined, the payment system 140 can identify the geo-location of the user device 110. By determining the location of the user device 110, the payment system 140 can identify the merchant 130 associated with that location. In an offline transaction, one skilled in the art would understand that if the user 101 is conducting a transaction utilizing the user device 110, then the user device 110 would be at the same location as the merchant 130 associated with the transaction. The geo-location of the user device 110 can be determined from the global positioning system hardware and software utilized by the user device 110. For example, the user device 110 can transmit the geo-location to the payment system 140 upon request or with every transaction request. Additionally or alternatively, the user device 110 can determine the geo-location from any other hardware or software technology available to the user device 110, such as a geo-location received from a Wi-Fi system being accessed by the user device 110 or other system.

In block 420, the payment system 140 can use the geo-location of the user device 110, and thus the location of the merchant 130, to determine the identity of the merchant 130. The identity may be determined by using a registry of merchant addresses, a mapping application or website, or other database or system to identify a merchant 130 from the geo-location of the merchant 130.

If the merchant is identified from the geo-location, then method 220 follows the "YES" branch of block 420 to block 425. If the merchant is not identified, then method 220 follows the "NO" branch of block 420 to block 430.

Following the YES branches of blocks 410 and 420 to block 425, the payment system can use the identity of the merchant 130 to identify the category to which the merchant 130 belongs. If the merchant 130 has previously conducted a transaction with the payment system 140, then the payment system 140 may have placed the merchant 130 in a category at that time. If the payment system 140 has previously placed the merchant 130 into a category, then the payment system 140 can identify the merchant in the database and extract the category in which the merchant 130 is stored.

Alternatively, the payment system 140 may employ a system for identifying merchants 130 and placing the merchants 130 in categories at a time other than at the time of a transaction. That is, the payment system 140 may continuously or periodically search for merchants 130 that are not categorized and attempt to place the merchants 130 in categories in the database. The payment system 140 may additionally or alternatively, subscribe to a system or service that updates the category codes, such as an MCC, and supplies the categories of merchants 130 to the payment system 140. The payment system 140 may utilize any other system or process to update the merchants 130 located in the category database.

If the merchant 130 is identified in a category, the payment system 140 can determine that the merchant 130 associated with the current transaction is the same merchant 130 located in the database. The payment system 140 can thus determine the category of the merchant 130.

If the merchant category is determined from the merchant 130 identity, then method 220 follows the "YES" branch of block 425 to block 225 with respect to FIG. 2. If the merchant category is not determined from the merchant 130 identity, then method 220 follows the "NO" branch of block 425 to block 430.

Following the NO branch of block 425, in block 430, the payment system 140 can use the products associated with the transaction to identify a merchant category. The products associated with the transaction can be identified from the description of the products, a model number associated with the products, a stock-keeping unit ("SKU") or other identifying code, or other identifier from the transaction.

In block 435, the products can be compared to the products sold by other merchants in the category database. If the merchant 130 sells similar products to other merchants in a category then the merchant 130 can be placed into that category. The payment system 140 may employ a scoring system to determine the category. For example, the merchant 130 may receive points for every product in common with the merchants in a product category. A threshold of points may be required to place the merchant 130 in the category. Any scoring system or other system for determining if the products of the merchant 130 match the products of the merchants in a category may be utilized.

In block 440, the payment system 140 associates the merchant 130 with the category of the merchants with which the merchant 130 sells similar products. The payment system 140 may associate the merchant 130 with the category for only the pending transaction or the payment system 140 may associate the merchant 130 with the selected category for future transactions. The association may be permanent or may be associated until such time as a more accurate category is assigned.

From block 440, the method 220 returns to block 225 in FIG. 2.

Returning to FIG. 2, in block 225, when the payment system 140 identifies the category of the merchant 130, the payment system 140 can select the preferred card and transmit the identity of the preferred card to the user device 110. In an alternative exemplary embodiment, the payment system 140 can transmit the category of the merchant 130 to the user device and the payment application 115 can determine the preferred card for the merchant category.

In block 230, the payment application 115 can display, via a user interface, the identity of the preferred card to the user 101. The user 101 can accept the card selected and proceed with the transaction or reject the selected card and select an alternative card. Alternatively, the payment application 115 may proceed with the transaction without the approval of the user 101.

In block 235, after selecting the preferred card, the payment application 115 can transmit the card information to the POS terminal 132 and complete the transaction.

In block 240, the merchant 130 can receive the card information and conduct the transaction with the issuer 170 of the selected card.

Some or all of the functions of the payment system 140 may be alternatively performed on the payment application 115 of the digital wallet 111. Additionally or alternatively, some or all of the functions of the payment application 115 and the digital wallet 111 may be performed on the payment system 140.

In an alternate embodiment, all of the steps can be performed in an online transaction. The user device 110 can attempt a transaction with an online merchant 130. The merchant 130 can submit the transaction and the merchant details. The payment system 140 or a payment application 115 can determine a category of the online merchant 130 via the process as described above. The payment system 140 or a payment application 115 can select a preferred card for that category and transmit the identification of the preferred card to the merchant 130 to conduct the transaction.

From block 240, the method 200 ends.

General

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed. Instructions also may be provided to users to notify them regarding policies about the use of information, including personally identifiable information, and manners in which each user may affect such use of information. Thus, information can be used to benefit a user, if desired, through receipt of relevant advertisements, offers, or other information, without risking disclosure of personal information or the user's identity.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary systems, methods, and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method to determine a merchant category for a merchant and to select a payment instrument for a purchase based on the merchant category, comprising:
   associating, by a computer, a plurality of financial accounts with a user account of a user, the user account being maintained by the computer;
   for one or more of the financial accounts associated with the user account, associating, by the computer, one of a plurality of merchant categories with the respective financial account;
   receiving, by the computer from a user computing device, data from a transaction of the user account with a merchant, the transaction being initiated with a communication between a point of sale terminal associated with the merchant and a payment application on the user computing device;
   determining, by the computer, a merchant category of the merchant by:
      identifying, by the computer, one or more products associated with the transaction based on an identification number associated with each of the one or more products in the transaction data;
      comparing, by the computer, the associated products with products associated with other merchants in a category database, the category database being stored on a data storage unit associated with the computer and accessed by the computer; and
      determining, by the computer, that the merchant is associated with the merchant category based on a similarity of the products associated with the merchant and the products associated with the other merchants associated with the merchant category in the category database;
   selecting, by the computer, a particular financial account of the financial accounts associated with the merchant category of the merchant with which to conduct the transaction;
   communicating, by the computer to the user computing device, the selected particular financial account;
   communicating, by the computer to the user computing device, instructions configured to cause the payment application to initiate and cause the selected particular financial account to display via the payment application on the user computing device; and
   communicating, by the computer to the user computing device, instructions to cause the user computing device to transmit data associated with the selected particular financial account to the point of sale terminal associated with the merchant to conduct the transaction.

2. The computer-implemented method of claim 1, wherein determining the category of the merchant comprises identifying, by the computer, one of more of the following features of the merchant from the data:
   a merchant name;
   a merchant address;
   a merchant telephone number; and
   a merchant store number.

3. The computer-implemented method of claim 1, wherein the transaction data comprises location data identifying a location of the user computing device, and wherein determining the category of the merchant based on location data comprises:
   extracting, by the computer, the location data identifying the location of the user computing device; and
   determining, by the computer, the identity of the merchant associated with the location of the user computing device.

4. The computer-implemented method of claim 1, wherein the category database comprises merchant names, merchant addresses, merchant phone numbers, merchant product offerings, merchant category codes, and merchant geo-locations.

5. A computer program product, comprising:
   a non-transitory computer-readable storage device having computer-executable program instructions embodied thereon that when executed by a computer cause the computer to select a payment instrument for a purchase based on a merchant category, the computer-executable program instructions comprising:
   computer-executable program instructions to associate a plurality of financial accounts with a user account of a user, the user account being maintained by the computer;
   computer-executable program instructions to associate, for one or more of the financial accounts associated with the user account, one of a plurality of merchant categories with the respective financial account in a category database;

computer-executable program instructions to receive, from a user computing device, data from a transaction of the user account with a merchant;
computer-executable program instructions to determine a merchant category of the merchant by:
    receiving data from a plurality of accounts of other users;
    determining financial accounts of the accounts of other users that are in common with the user account;
    determining merchant categories associated with the common financial accounts of the user account and the other user accounts; and
    selecting a particular merchant category that is associated with the greatest number of the financial accounts of the accounts of other users that are in common with the user account;
computer-executable program instructions to select one of the financial accounts associated with the selected merchant category of the merchant with which to conduct the transaction;
computer-executable program instructions to communicate the selected financial account to the user computing device to conduct the transaction;
computer-executable program instructions to communicate program instructions to the user computing device configured to cause the payment application to initiate and cause the selected financial account to display via the payment application on the user computing device; and
computer-executable program instructions to communicate, to the user computing device, instructions configured to cause the user computing device to transmit data associated with the selected financial account to the point of sale terminal associated with the merchant.

6. The computer program product of claim 5, wherein determining the category of the merchant comprises identifying, by the computer, one of more of the following features of the merchant from the data:
    a merchant name;
    a merchant address;
    a merchant telephone number; and
    a merchant store number.

7. The computer program product of claim 5, wherein the transaction data comprises identification data identifying a merchant, and wherein determining the category of the merchant from the transaction data comprises:
    extracting an identification of the merchant from the data from the transaction;
    locating the identified merchant in the category database; and
    determining the category associated with the merchant in the database.

8. The computer program product of claim 5, wherein the category database comprises merchant names, merchant addresses, merchant phone numbers, merchant product offerings, merchant category codes, and merchant geo-locations.

9. A system to select a payment instrument for a purchase based on a merchant category, comprising:
    a storage resource;
    a network module;
    a processor communicatively coupled to the storage resource and the network module, wherein the processor executes application code instructions that are stored in the storage resource to cause the system to:
        associate a plurality of financial accounts with a user account of a user, the user account being maintained by the computer;
        associate, for one or more of the financial accounts associated with the user account, one of a plurality of merchant categories with the respective financial account in a category database;
        receive, from a user computing device, data from a transaction of the user account with a merchant;
        determine a merchant category of the merchant by:
            identifying one or more products associated with the transaction;
            comparing the associated products with a list of products associated with other merchants in the category database; and
            determining that the merchant is associated with a category of merchants based on a similarity of the products associated with the merchant and the products associated with the merchants associated with the category;
        select one of the financial accounts associated with the determined merchant category of the merchant with which to conduct the transaction;
        communicate instructions configured to cause the user computing device to initiate a payment application and to display the selected financial account via the payment application on the user computing device; and
        communicate, to the user computing device, instructions configured to cause the user computing device to transmit data associated with the selected financial account to a point of sale terminal associated with the merchant;
    a user computing device storage resource;
    a user computing device network module; and
    a user computing device processor communicatively coupled to the user computing device storage resource and the user computing device network module, wherein the processor executes application code instructions that are stored in the user computing device storage resource to cause the system to:
        initiate the payment application and display the selected financial account via the payment application based on the received instructions; and
        transmit data associated with the selected financial account to the point of sale terminal associated with the merchant based on the received instructions.

10. The system of claim 9, wherein determining the category of the merchant comprises identifying, by the computer, one of more of the following features of the merchant from the data:
    a merchant name;
    a merchant address;
    a merchant telephone number; and
    a merchant store number.

11. The system of claim 9, wherein the transaction data comprises location data identifying a location of the user computing device, and wherein determining the category of the merchant from the transaction data comprises instructions further causing the system to:
    extract the location data identifying the location of the user computing device;
    determine the identity of the merchant associated with the location of the user computing device;
    locate the identified merchant in the category database; and
    determine the category associated with the merchant in the database.

12. The system of claim 9, wherein the transaction data comprises identification data identifying a merchant, and wherein determining the category of the merchant from the transaction data comprises:
- extracting an identification of the merchant from the data from the transaction;
- locating the identified merchant in the category database; and
- determining the category associated with the merchant in the database.

13. The system of claim 9, wherein the category database comprises merchant names, merchant addresses, merchant phone numbers, merchant product offerings, merchant category codes, and merchant geo-locations.

* * * * *